(12) United States Patent
Samdanis et al.

(10) Patent No.: US 11,197,202 B2
(45) Date of Patent: Dec. 7, 2021

(54) SYSTEM AND METHOD FOR OPERATING A WIRELESS NETWORK

(71) Applicant: NEC Laboratories Europe GmbH, Heidelberg (DE)

(72) Inventors: Konstantinos Samdanis, Munich (DE); Vincenzo Sciancalepore, Heidelberg (DE); Andreas Kunz, Ladenburg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 652 days.

(21) Appl. No.: 15/999,478

(22) PCT Filed: Feb. 17, 2016

(86) PCT No.: PCT/EP2016/053335
§ 371 (c)(1),
(2) Date: Sep. 19, 2018

(87) PCT Pub. No.: WO2017/140356
PCT Pub. Date: Aug. 24, 2017

(65) Prior Publication Data
US 2021/0153077 A1    May 20, 2021

(51) Int. Cl.
*H04W 28/24*    (2009.01)
*H04W 16/14*    (2009.01)
(Continued)

(52) U.S. Cl.
CPC ........... *H04W 28/24* (2013.01); *H04W 16/14* (2013.01); *H04W 24/02* (2013.01); *H04W 48/18* (2013.01)

(58) Field of Classification Search
CPC ..... H04W 28/24; H04W 16/14; H04W 24/02; H04W 48/18
See application file for complete search history.

(56) References Cited

U.S. PATENT DOCUMENTS

2010/0149971 A1    6/2010  Noriega
2013/0303114 A1    11/2013 Ahmad et al.
(Continued)

OTHER PUBLICATIONS

3GPP TS 23.401 V13.4.0 (Sep. 2015), "3rd Generation Partnership Project; Technical Specification Group Services and System Aspects; General Packet Radio Service (GPRS) enhancements for Evolved Universal Terrestrial Radio Access Network (E-UTRAN) access (Release 13)", Sep. 2019, pp. 1-334.
(Continued)

*Primary Examiner* — Wayne H Cai
(74) *Attorney, Agent, or Firm* — Leydig, Voit & Mayer, Ltd.

(57) ABSTRACT

A method for operating a wireless network, which includes a management entity for managing the use of network resources, includes, by the management entity: performing a network traffic forecast for a time period, the network traffic forecast estimating expected traffic demands with a pre-defined or tunable confidence degree; dividing forecasted available network resources into one or more classes of traffic corresponding to different service qualities within the classes of traffic using the confidence degree; and defining and allocating at least one network resource slice of at least one of the one or more classes of traffic to operators and/or third parties for the time period considering a service level agreement (SLA) of incoming service requests.

17 Claims, 4 Drawing Sheets

(51) Int. Cl.
*H04W 24/02* (2009.01)
*H04W 48/18* (2009.01)

(56) References Cited

U.S. PATENT DOCUMENTS

| | | | |
|---|---|---|---|
| 2014/0089489 A1 | 3/2014 | Duvnjak | |
| 2017/0163545 A1* | 6/2017 | Jing | ................. H04L 47/20 |
| 2017/0201964 A1* | 7/2017 | Gupta | ................. H04W 12/041 |

OTHER PUBLICATIONS

3GPP TS 23.682 V12.2.0 (Jun. 2014), 3$^{rd}$ Generation Partnership Project; Technical Specification Group Services and System Aspects; Architecture enhancements to facilitate communications with packet data networks and applications (Release 12), Jun. 2014, pp. 1-32.
3GPP TS 32.130 V12.0.0 (Dec. 2014), 3$^{rd}$ Generation Partnership Project; Technical Specification Group Services and System Aspects; Telecommunications management; Network sharing; Concepts and requirements (Release 12), Dec. 2012, pp. 1-15.
3GPP TS 23.251 V12.1.0 (Jun. 2014), 3$^{rd}$ Generation Partnership Project; Technical Specification Group Services and System Aspects; Network Sharing; Architecture and functional description (Release 12), Jun. 2014, pp. 1-35.

\* cited by examiner

SYSTEM AND METHOD FOR OPERATING A WIRELESS NETWORK

CROSS-REFERENCE TO PRIOR APPLICATIONS

This application is a U.S. National Stage Application under 35 U.S.C. § 371 of International Application No. PCT/EP2016/053335 filed on Feb. 17, 2016. The International Application was published in English on Aug. 24, 2017 as WO 2017/140356 A1 under PCT Article 21(2).

FIELD

The present invention relates to a system and method for operating a wireless network.

BACKGROUND

As mobile network operators are facing a tremendous traffic increase, there is urgency to enhance the network infrastructure, a costly process potentially beyond their direct revenue range. The benefits of such enhanced network infrastructure are evident at peak-times, but with the majority of time wasting resources and hence investment. Network sharing provides Mobile Network Operators, MNO, i.e. infrastructure providers, a way for reducing capital and operational expenditures. It can also facilitate new revenue sources accommodating vertical market players, e.g. Over-The-Top, OTT, providers, automotive communication, home device management, energy grid, etc. by opening the network infrastructure.

The 3rd Generation Partnership Project, 3GPP, has studied and standardized network sharing considering initially passive solutions, where mobile operators share base station sites, masts, antennas, etc., and later active solutions enabling the sharing of radio resources based-on contractual agreements. 3GPP has specified two different network architectures for supporting active sharing in 3GPP TS 23.251, Network Sharing; Architecture and Functional Description, Rel. 12, Jun. 2014: (i) the Multi-Operator Core Network, MOCN, where individual operators share particular components of the radio access network, i.e. selected base stations, which are connected directly to core network elements belonging to particular MNO using a separate S1 interface and (ii) the Gateway Core Network, GWCN, in where operators additionally share the Mobility Management Entity, MME.

Current network sharing solutions such as disclosed within Flexible network sharing, US 2013/0303114 A1, November 2013, concentrate on allocating only guaranteed bandwidth resources, providing a single type of network slice.

Further, utilizing dedicated resources for special services is already considered in 3GPP TS 23.401, General Packet Radio Service (GPRS) enhancements for the Evolved Universal Terrestrial Radio Access Network (E-UTRAN) Access, Rel. 13, v 13.4.0, September 2015, i.e. as a part of the subscription related to a service. The use case behind is simply to (re)route Initial Attach requests from the UE (User Equipment) to a dedicated core network node based on this subscription, which is linked to the service. This does not tackle the dynamics of third party's requests, while its scope is not multi-tenancy, but multi-service support focusing only on core network resources.

SUMMARY

In an embodiment of the present invention, a method is provided for operating a wireless network, which includes a management entity for managing the use of network resources. The method includes, by the management entity: performing a network traffic forecast for a time period, the network traffic forecast estimating expected traffic demands with a predefined or tunable confidence degree; dividing forecasted available network resources into one or more classes of traffic corresponding to different service qualities within the classes of traffic using the confidence degree; and defining and allocating at least one network resource slice of at least one of the one or more classes of traffic to operators and/or third parties for the time period considering a service level agreement (SLA) of incoming service requests.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
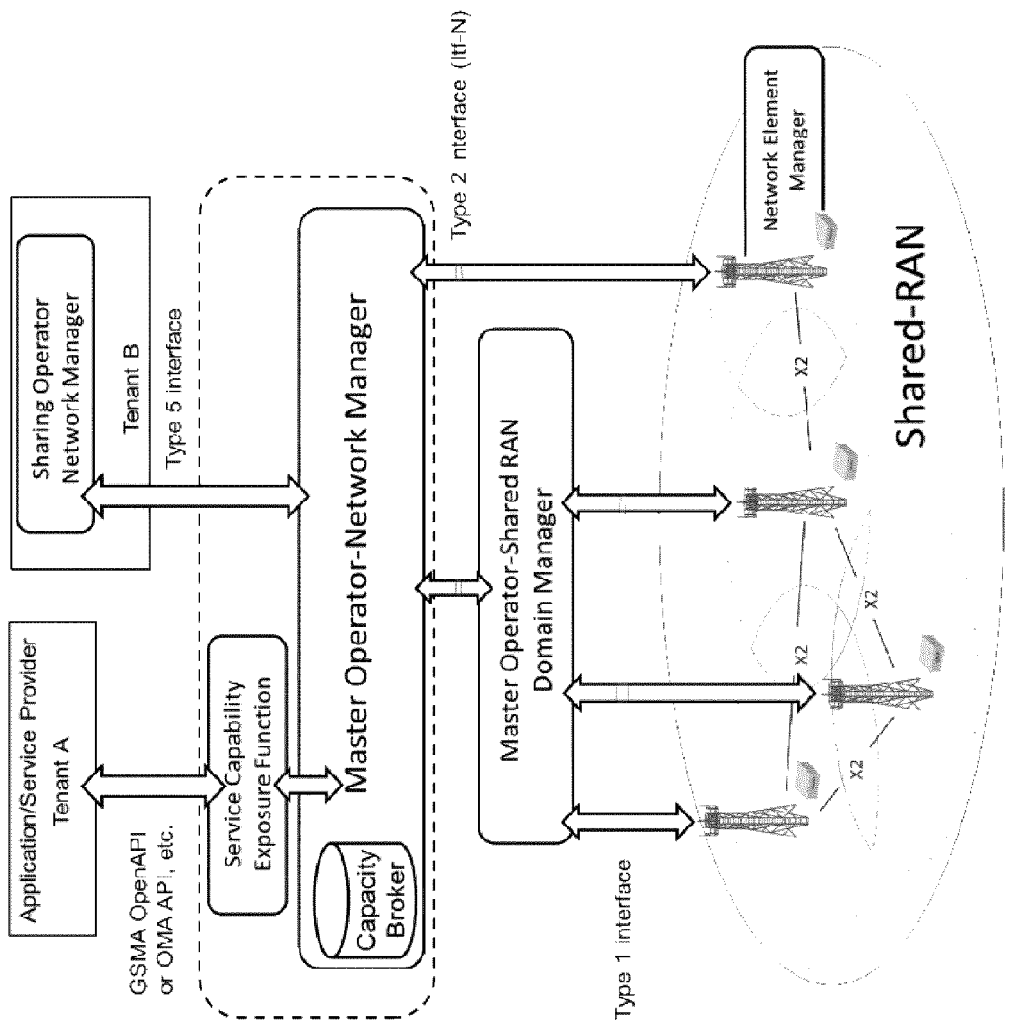
FIG. 1 is a diagram of an embodiment of a network according to the present invention with a network sharing management architecture.

Embodiments of the present invention provide an improved method for operating a wireless network, a corresponding wireless network and a management entity for providing an efficient resource allocation within the network.

Embodiments of the present invention exploit the network sharing paradigm from the resource management perspective.

In accordance with the invention, an embodiment provides a method for operating a wireless network, the use of network resources being managed by a management entity within the network. The management entity performs a network traffic forecast for a definable time period. The network traffic forecast estimates expected traffic demands with a predefined or tunable confidence degree, divides forecasted available network resources into one or more classes of traffic reflecting different service quality within the classes using the confidence degree, and defines and allocates at least one network resource slice of the class or classes of traffic to operators and/or third parties for the time period considering an SLA (Service Level Agreement) of incoming service requests.

Further, an embodiment provides a wireless network, including a management entity for managing the use of network resources. The management entity is designed for performing a network traffic forecast for a definable time period. The network traffic forecast estimates expected traffic demands with a predefined or tunable confidence degree, dividing forecasted available network resources into one or more classes of traffic reflecting different service quality within the classes using the confidence degree, and defining and allocating at least one network resource slice of the class or classes of traffic to operators and/or third parties for the time period considering an SLA of incoming service requests.

Further, an embodiment provides a management entity for managing the use of network resources within a wireless network. The management entity is designed for performing a network traffic forecast for a definable time period. The network traffic forecast estimates expected traffic demands with a predefined or tunable confidence degree, dividing forecasted available network resources into one or more classes of traffic reflecting different service quality within the classes using the confidence degree, and defining and allocating at least one network resource slice of the class or classes of traffic to operators and/or third parties for the time period considering an SLA of incoming service requests.

The term "network resources" implies "radio resources" within this document.

According to the invention embodiments provide an efficient resource allocation within the network by widening the functionality of a management entity. For managing radio resources the management entity first performs a network traffic forecast for a definable time period. Here, the network traffic forecast estimates expected traffic demands with a predefined or tunable confidence degree. The prior traffic volumes can be taken into account to estimate expected traffic demands. On the basis of the traffic forecast the management entity divides forecasted available network resources into one or more classes of traffic. The management unit reflects different service quality within the classes using the confidence degree. In other words, different classes are specified for providing different service quality within each class. Then, the management entity defines and allocates at least one network resource slice of the class or classes of traffic to, for example, virtual operators and/or third parties for the requested time period. Within this defining and allocating step the management entity considers a Service Level Agreement, SLA, of one or more incoming service requests. Based on this method, network resources can be accommodated in real-time for a specific time window or time period. The network resources can be dedicated to a network slice associated with different tenants, across Radio Access Network, RAN, elements and core network elements, based on the SLA of the incoming service request or network slice request. Thus, on the basis of methods of the present invention, an efficient resource allocation within the network is provided.

According to an embodiment of the invention, the management entity can perform admission control. Thus, the management entity can be responsible for admission control and network slice allocations considering on the one hand a SLA and a starting time and on the other hand the forecasted traffic as well as the resource availability.

According to a further embodiment, the network traffic forecast can extract regular patterns from an aggregated traffic signal. In this case the forecasting method can use the Fast Fourier Transform, FFT, or Inverse Fast Fourier Transform, IFFT. Alternatively, the network traffic forecast can separate the forecasting or prediction for guaranteed traffic and elastic or best-effort traffic. The selected forecasting algorithm can then be applied on each component individually.

According to a further embodiment, the network traffic forecast can be updated at predefined time or observation periods by using, for example, a recursive scheme. Such a repeated network traffic forecasting can be helpful for providing an actual traffic forecast and an efficient resource allocation by embodiments of the present invention.

Within a further embodiment, the classes or slices can be based on guaranteed or elastic or best-effort resources. Guaranteed resources address guaranteed traffic needs. Such resources can be used for any type of service including Quality of Service, QoS, and sensitive service. Elastic recourses or best-effort resources can be used for best-effort or delay tolerant services. By using such a differentiation between different types of classes or slices, a very efficient resource allocation within the network is provided. Network slices for guaranteed services can use the forecasted resources with at least a confidence degree of 100%, while best-effort network slices or elastic network slices can utilize all other available resources.

Elastic or best-effort resources can be provided as a single resource pool that can be shared by all participant operators and third parties, or can be provided as a number of predefined slices complying with one or more predefined characteristics. Such characteristics can include a particular set of delay, throughput and service discontinuity characteristics.

According to a further embodiment, one or more limits can be specified to distinguish the classes based on the traffic forecast. Here, one or more resources beyond an upper limit of the forecasted traffic is or are allocated for slices based on guaranteed resources. Remaining resources can be used for providing one or more classes or slices based on elastic or best-effort resources. There can be specified a set of limits to distinguish the different traffic classes based on the forecasted traffic, where the set of resources beyond the upper bound of the forecasted traffic is allocated for guarantee quality, while the remaining of resources can be divided into one or more service classes with different quality guarantees for best-effort traffic depending on the portion of resources utilized by an operator that provides the infrastructure. This specification of one or more limits further helps in providing an efficient resource allocation within the network.

According to a further embodiment, network resource slices based on elastic or best-effort resources can be allocated under consideration of minimizing a utility function, which relates the resources by introducing a proportional weight based on request performance parameters or service requirement or characteristic, such that available resources defined for each performance parameter or service requirement or characteristic are minimized. For instance, a higher priority can be given to service disruption tolerance parameter—with the highest weight—, while giving lower priority to jitter value parameter. In order to prioritize the performance parameters specified within the traffic request, a set of weights can be defined for each performance parameter.

According to a further embodiment, a predefined policy can be associated to a slice. Slices can be accompanied with a specific policy enforced by PCRF (Policy and Changing Rules Function), ANDSF (Access Network Discovery and Selection Function) and/or MME (Mobility Management Entity), for example.

According to a further embodiment, the management entity can translate a network slice request in an appropriate service description and can select the corresponding PCRF or PCRFs, where the selection of the PCRF(s) is based on the network slice associated with a UE (User Equipment).

Alternatively or additionally, the management entity can create a slice identifier out of a set of predefined slice identifiers that corresponds to a specific network slice request parameter for QoS and is preferably configured in the SPR, which can be used by the PCRF.

Alternatively or additionally, the PCRF can send a network slice configuration request to the Packet Data Network Gateway, PDN-GW or PGW, for the affected UEs or for a slice using the slice identifier.

Within a further embodiment, a network resource slice can be restricted in time, can be applied to a single User Equipment, UE, or to a group of UEs, or can vary in terms of QoS characteristics. Such a restriction, application or variation of a network resource slice can depend on individual application requirements or service requests.

Within a further embodiment, the defining and allocating step can consider additionally a starting time, a mobility profile of a user or UE and/or a duration of a service request. However, the invention is not limited to the special requirements or characteristics.

According to embodiments, the concept of on-demand network slicing is developed, which allocates network slices considering the service requirements of incoming requests. Embodiments of the present invention introduce: (i) a management entity in the form of a capacity broker, for example, that estimates traffic demands and performs admission control operations, (ii) the different types of network slices to properly address guaranteed traffic needs and maximize elastic traffic request admissions within the available resources, (iii) the allocated resources as part of the subscriptions, which are strictly related to the intended service, and (iv) the policy provision associated with the network slice allocation.

Embodiments of this invention build on the top of the 3GPP specified architectures introducing a dynamic, on-demand signaling based resource sharing mechanism. Such a mechanism can allocate resources, which are here defined as network slices, to Mobile Virtual Network Operators, MVNOs, and third parties, considering the service requirements of incoming requests. Network slicing provides resource isolation and policy customization among distinct MNVOs and vertical market parties. To manage the allocation of network slices, embodiments of this invention rely on the paradigm of the capacity broker, a logically centralized entity that resides into the infrastructure provider's network in charge of admission control operations. Additionally, the management entity or capacity broker performs traffic forecasting and resource management operations.

In embodiments of this invention, the management entity or capacity broker addresses different types of traffic by specifying for each of them a distinct subset of network slices. In particular, network slicing operations are properly guided by the service type, e.g. voice, video, file download, web-browsing, sensor data transmission, etc., allocating a different portion of available resources based on certain service characteristics including metrics such as bandwidth, delay, packet loss, jitter as well as service disruption. Embodiments of this invention also consider two different ways of sharing resources allocated for network slices; one considering dedicated resources and a second wherein network resources are pooled and shared equally among all participant MNVOs and vertical market parties. Specifically, one of the objectives of this invention is to assign incoming requests to the appropriate network resource slice introducing a corresponding policy by means of a Policy and Changing Rules Function, PCRF, which considers the characteristics of the service and monetizes efficiently the infrastructure provider resources.

Embodiments of the invention accommodate in real-time for a specific time window the network resources dedicated to a network slice associated with different tenants, across RAN and core network elements, based on the SLA of the network slice request.

Advantages and aspects of embodiments of the present invention include the following.

Embodiments of this invention introduce a method to facilitate on-demand network sharing enabling a centralized management entity, i.e. a capacity broker, to perform resource allocation for elastic best effort services based-on the confidence degree of the traffic prediction in combination with the service parameters of the incoming network slice requests from 3rd parties and MVNOs taking into account the indicated starting time and duration as well as an SLA, e.g. delay, throughput, loss, jitter, etc. and mobility profile, e.g. stationary, pedestrian, vehicular, high speed, etc.

Embodiments of this invention introduce a method where at least two or more types of resource allocation are assigned besides guaranteed one, where a set of dedicated resources are used considering elasticity in terms of the SLA characteristics, or where the resources are pooled and used by a set of participants on-demand assuring a different degree of service quality.

Embodiments of this invention introduce a method where the optimal allocation of best-effort resources is performed considering a proportional weight based-on the network resource slice request performance parameters.

Embodiments of this invention specify a set of limits to distinguish the different traffic classes based-on the forecasted traffic, where the set of resources beyond the upper bound of the forecasted traffic is allocated for guarantee quality, while the remaining of resources can be divided into one or more service classes with different quality guarantees for best effort traffic depending on the portion of resources utilized by MNO that provides the infrastructure.

An embodiment of the invention provides a method where the capacity broker initiates a specified policy related to the assigned network slice in order to fulfill the SLA demands.

Embodiments of the invention define a method for providing multi-tenancy support in 3GPP networks accommodating on-demand capacity request of MVNOs and vertical market player, including the steps of
1) Performing traffic forecasting.
2) Dividing the forecasted available resources into one or more classes of traffic reflecting different service quality.
3) Receiving a network slice request.
4) Allocating network slice depending on the service type(s).
5) Optionally: Accompany slices with specific policy enforce by PCRF/ANDSF/MME.

Embodiments of this invention optimize the resource allocation of the infrastructure provider by selecting the resources that can be used for each service type.

There are several ways how to design and further develop the teaching of the present invention in an advantageous way. To this end it is to be referred to the following explanation of examples of embodiments of the invention, illustrated by the drawings.

Within the following explanation of embodiments of the invention the terms "management entity" and "capacity broker" are used synonymously without any limitation to one of the functional entities.

Embodiments of this invention introduce a method that facilitates network sharing by allocating a number of different service-oriented network slices for MVNOs or vertical market players. The notion of service is defined in this invention in the context of an application as: a set of network resources associated with a predefined set of network performance requirements e.g. delay, loss, throughput, etc. The proposed method relies on a centralized management entity referred to as capacity broker, which resides on the infrastructure provider or master operator premises and specifically at the 3GPP network manager to take advantage of the collected network monitoring information, see 3GPP TS 32.130, Telecommunication management; Network Sharing; Concepts and requirements, Rel. 12, December 2014. The capacity broker is responsible for admission control and network slice allocations considering on the one hand the SLA, the starting time and optionally the mobility profile and duration of an incoming MVNO or 3rd party request, while on the other hand the forecasted traffic as well as the resource availability.

The capacity broker interacts with (i) MVNOs or sharing operators in 3GPP terminology via the Type 5 interface that provides connectivity among network manager systems and with (ii) network elements via the Type 2 Itf-N interface or optionally using additionally the Type 1 Itf-B interface, following the network management paradigm specified in 3GPP TS 32.130, Telecommunication management; Network Sharing; Concepts and requirements, Rel. 12, December 2014. The Type 5 interface communicates incoming request from MVNOs, while Itf-N and Itf-B configure the network slices at the corresponding network elements, while all aforementioned interfaces provide the network monitoring services. The interaction with the vertical market players can be achieved via the Service Explore Capability Function, SECF, see 3GPP TR 23.682, Architecture enhancements to facilitate communications with packet data networks and applications, Rel. 13, v 13.3.0, September 2015, using established Application Protocol Interfaces, APIs, such as the GSMA (Groupe Speciale Mobile Association) open API or OMA (Open Mobile Alliance) API, etc. In this invention the SECF can be logically integrated with the master operator network manager being able to interact closely with capacity broker. An overview of the network sharing management architecture considered in this invention is illustrated in FIG. 1.

This invention extends prior management entity concepts in where only guaranteed resources are considered for assigning network slices to particular MVNO or 3rd party request, by introducing network slices based on elastic resources, which are characterized by variable delay and service discontinuity tolerance. This brings an additional gain for best effort traffic, making the invention more flexible even when network resource slice requests may tolerate service disruption.

Network resource slices with guaranteed resources can be used for any type of service including Quality of Service, QoS, sensitive service, e.g. voice or video, while resources with non-stringent requirements suit only best effort or delay tolerant services. Within an embodiment of this invention, the capacity broker carries out the process of traffic forecasting e.g. using temporal, spatial dependence models, etc., which take into account prior traffic volumes to estimate the expected traffic demands with a tunable safety margin, namely confidence degree, $\delta$. In principle, the lower the confidence degree, $\delta$, the less accurate the traffic prediction; hence, the higher the risk to overload available resources. In wireless networks, non-uniform user movements, e.g. due to the presence of gravity points that concentrate more users, produce load irregularities along time. To achieve a more accurate prediction, forecasting methods need to extract regular patterns from the aggregated traffic signal, e.g. using the Fast Fourier Transform, FFT/Inverse Fast Fourier Transform, IFFT, or separate the forecasting for guaranteed and best-effort traffic. The selected forecasting algorithm can then be applied on each component individually and finally the results can then be aggregated. A recursive scheme is needed to update the traffic forecasting signal at regular observation periods.

Figure 2:
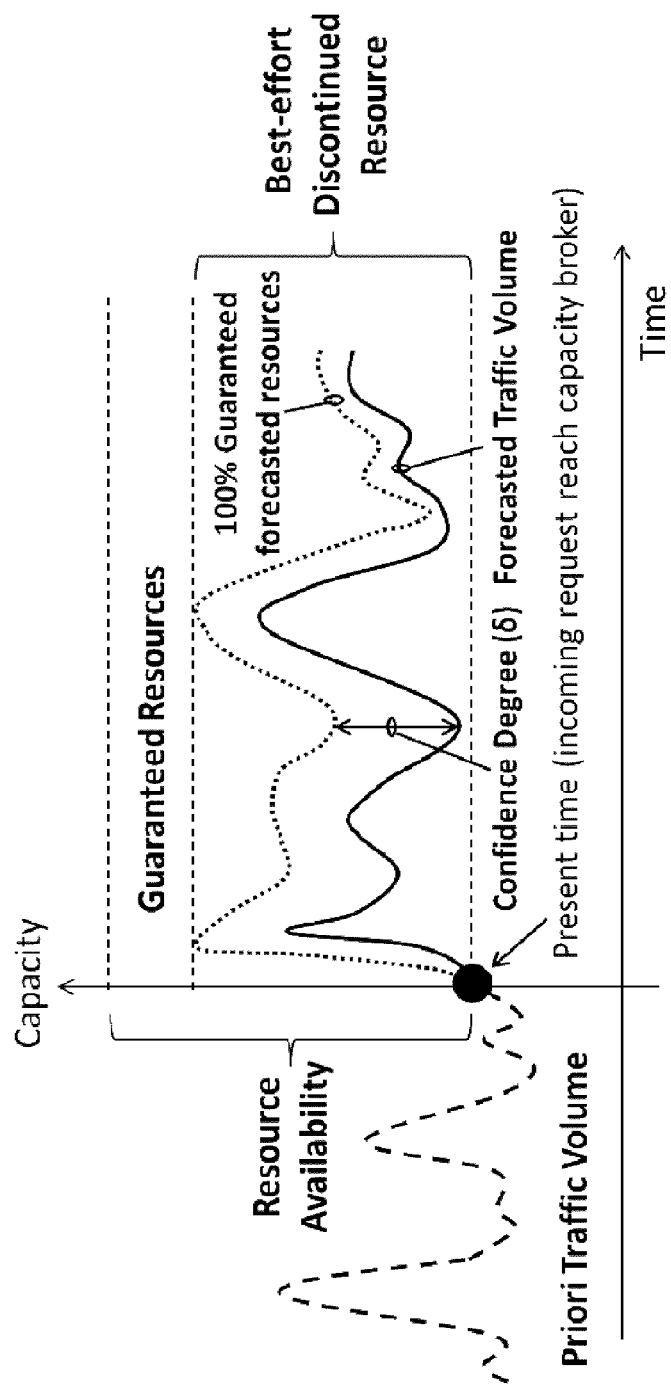
FIG. 2 is a diagram of a resource allocation for different traffic classes according to an embodiment of the invention.

Traffic forecasting allows the capacity broker to perform admission control when allocating a network slice for a MVNO or third party, with the ultimate goal to maximize the use of free resources inside the infrastructure provider network while satisfying the desired SLA creating additional revenue sources. Practically, there is a trade-off between maximizing the network utilization and satisfying SLAs; the confidence degree, $\delta$, will regulate how conservative the resource allocation process is carried out by the infrastructure provider. The admission control is performed by the capacity broker considering the worst network resource condition, envisaged as the lower bound confidence degree, either with 100% for guaranteed traffic or with a specified confidence degree value, $\delta$, for best effort. FIG. 2 illustrates an example of the network slice allocation process at the capacity broker showing the forecasted traffic signal based on a-priori traffic volume. At present time a request arrives at the capacity broker inquiring a network slice with a particular SLA. The capacity broker assesses the available resources considering the defined confidence degree, $\delta$, and allocates a network slice either with guaranteed resources, i.e. with a 100% confidence degree, or within the best effort area if the service can tolerate delay and service discontinuity.

In one embodiment, the capacity broker allocates network slices for guaranteed services using the forecasted resources with at least a confidence degree of 100%, while best-effort network slices can utilize all other available resources. This may incur in a service discontinuity as resources might not be always free for the entire duration of a network slice request, but are partially utilized by other prioritized traffic associated with direct customers of the master operator or infrastructure provider. In particular, the best-effort resources can be accommodated either (i) as a single resource pool that can be shared by all participant MVNOs and third parties or (ii) as a number of predefined network slices which comply with a particular set of delay, throughput and service discontinuity characteristics.

For the case of a single shared resource pool, certain policies should be placed to assure prioritization of a particular network slice corresponding to a MVNO or vertical market party. Such policies should reflect the incoming SLA requests of a MVNO or third party. In a different arrangement, an equal resource sharing policy can be applied among all participant MVNOs and third parties, simplifying the policy provision. Once the SLA of an incoming request cannot be satisfied or the admission of an incoming request causes the SLA of an ongoing request to degrade below the desired limits, such request is not admitted.

While performing admission control, the following service metrics are considered: delay—expressed in seconds—, service disruption—expressed in seconds given a time interval, or percentage—, packet loss—expressed in percentage—, requested data—expressed in bits—, throughput—expressed in bit per second—, jitter—expressed in seconds—and requested time—expressed in seconds. Optionally, a set of services with predefined parameters may speed up the network slicing operations.

Figure 3:
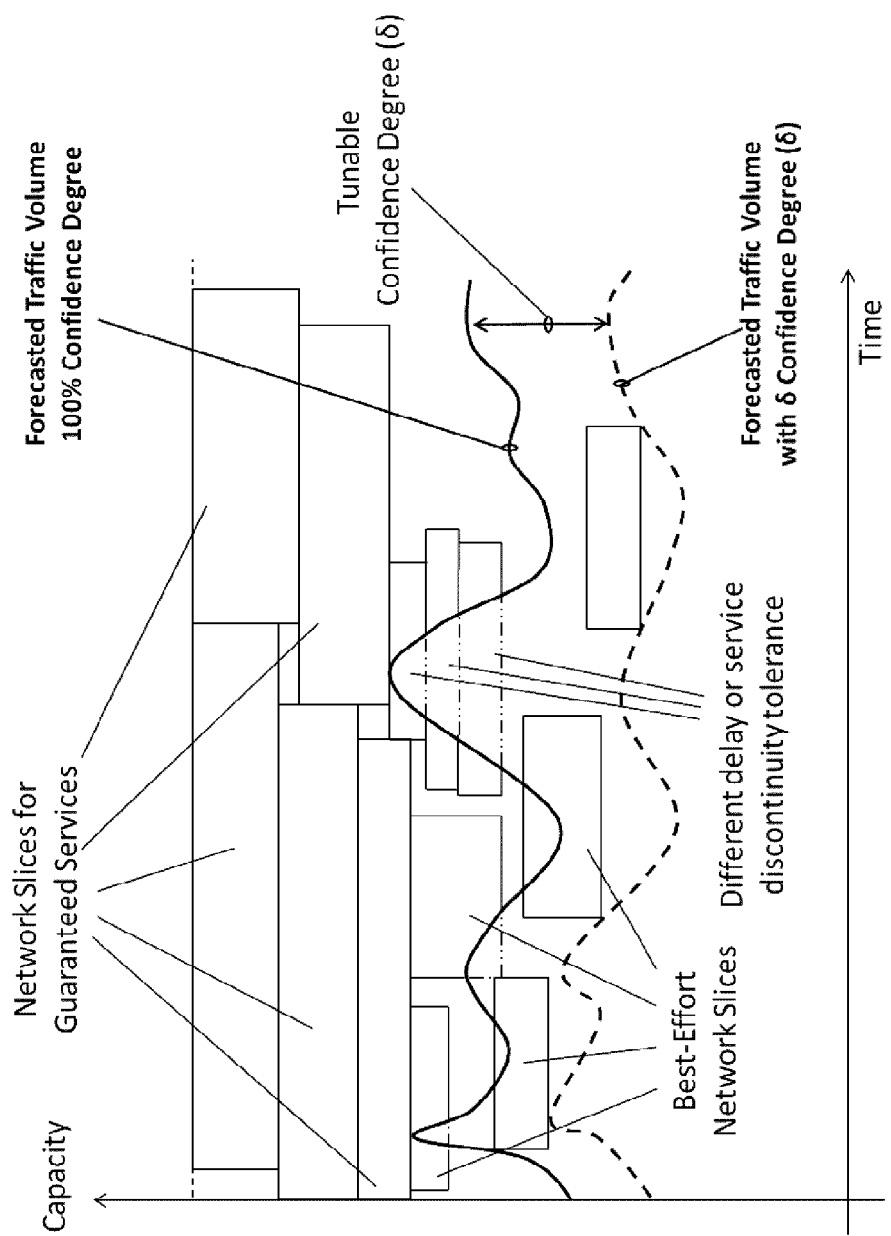
FIG. 3 is a diagram of the allocation of network slices for different service classes according to an embodiment of the invention.

An example that illustrates the network slices allocated by the capacity broker is shown in FIG. 3, which depicts the guaranteed resources and different network slices to accommodate best-effort services, considering the forecasted traffic signal with different confidence degrees. For the guaranteed services, network slices receive a dedicated amount of bandwidth, while for best-effort network slices obtain different performance parameters.

Once the confidence degree, δ, has been set by the infrastructure provider, the capacity broker allocates network slices for guaranteed traffic. This process is periodically repeated based on prior experiences. Network slices for guaranteed traffic are placed above the forecasted traffic signal with confidence degree 100%, as shown in FIG. 3. Best-Effort network slices are allocated for those resources which are not currently used by the guaranteed traffic. They may experience service disruption and delay depending on the resource volume allocated for the guaranteed traffic. Best-effort network slices cannot be allocated below the forecasted traffic volume with a fixed confidence degree, δ, as per resource availability. Optionally, best-effort traffic network slicing could be performed by considering the potential service discontinuity the SLA could tolerate. Different mechanisms to allocate best-effort network slices are defined, each of those based on different utility function.

One potential embodiment requires an optimal allocation of best-effort resources by minimizing the utility function, which relates the resources by introducing a proportional weight based-on the slice request performance parameters. For instance, we can give higher priority to service disruption tolerance parameter—with the highest weight—, while giving lower priority to jitter value parameter. In particular, we assume that an upcoming elastic network slice request $d(P)=(d_1, d_2, \ldots, d_P)$ requires a set of performance parameters $p \in P$, such as delay, throughput, service disruption, request data, etc., and the capacity broker allocates a network slice for a fixed time window $(t_1;t_2)$, such that the available resources $r_p$ defined for each performance parameter $p \in P$, are minimized. In order to prioritize the performance parameters specified within the traffic request, a set of weights $w_p$ is defined for each performance parameter $p \in P$. The network slicing problem can be formulated as follows:

$$Z(d) = \min \int_{t1}^{t2} \sum_{p \in P} w_p r_p$$

subject to $d_p \leq r_p, \forall\ p \in P.$

This easily applies to different utility functions $Z(d)$, which might be proposed to optimize different network behaviors.

Figure 4:
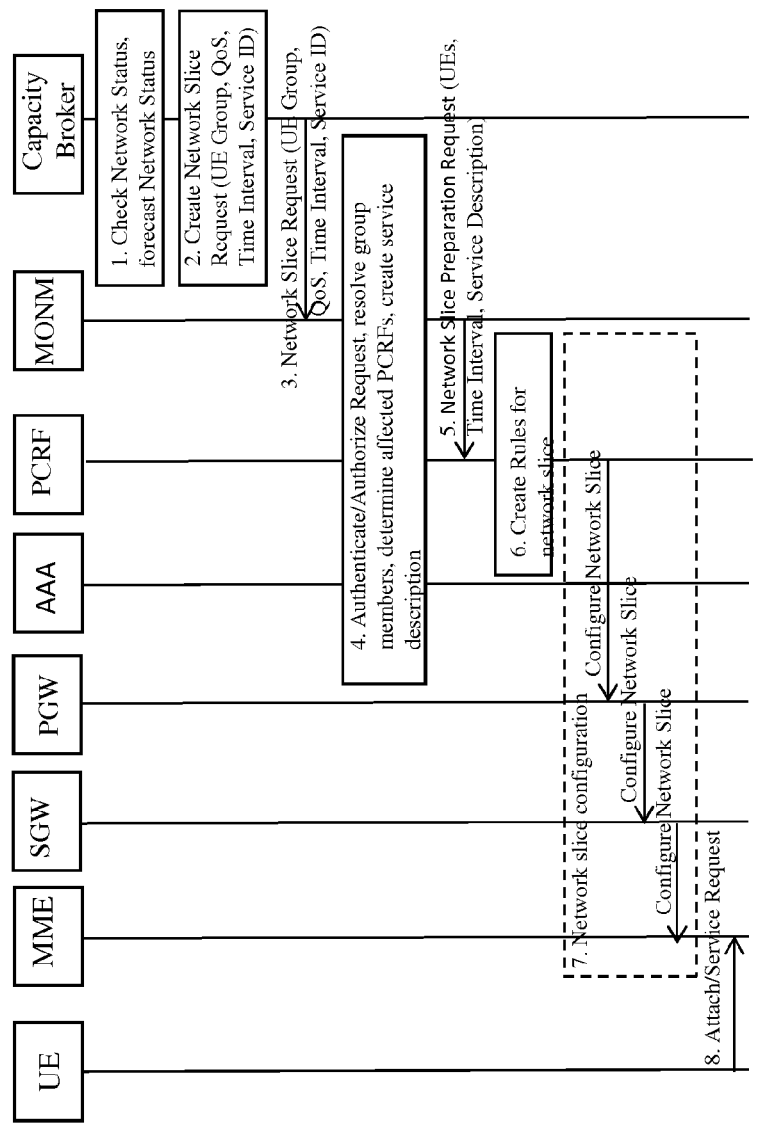
FIG. 4 is a diagram of a network slice request for a management entity in the form of a capacity broker according to an embodiment of the invention.

Once the capacity broker admits a new network slice it also associates a particular policy to assure that such a network slice receives the requested SLA. It should be noted that network slices may be restricted in time, can be applied to a single UE or for a group of UEs and can vary in terms of QoS characteristics, which are linked to a specific service or subscription. Such a procedure is carried out considering the following steps as shown in FIG. 4 provided that an MVNO or vertical market player requests a network slice for a given start time and interval, with a specific SLA, for a particular UE or group of UEs:

1. The capacity broker is able to compute a forecast profile, selecting the network elements for the given time window for the considered UEs in the network slice request.
2. The capacity broker can then perform admission control based-on forecasted traffic.
3. The capacity broker calculates the required parameters for a network slice request and sends it to the Master Operator Network Manager, MONM, which contains at least the aggregated QoS, location, and time interval, service description etc.
4. The Master Operator Network Manager translates the request in an appropriate service description and selects the corresponding PCRF(s). The selection of the PCRF(s) is based on the UEs subject to the network slicing request. The MONM may create a slice identifier that can be used by the PCRF. For this case the MONM may have a set of predefined slice identifiers that corresponds to specific network slice request parameters for QoS and is preferably configured in the SPR or Special Purpose Register. The PCRF may use it to request the corresponding information from the SPR based on the slice identifier in a similar manner as done for individual UEs. This would require preconfigured knowledge about slice identifiers and QoS settings in the SPR and in the MONM. For a more dynamical rule assignment the slice identifier assignment is left to the PCRF.

The MONM may update the AAA (Authentication, Authorization, and Accounting) with the list of UEs belonging to the specific slice and the AAA creates a binding with the slice identifier. The MME is part of the slice and the dedicated MME identifier is included in the binding information. The selection of the MME for the time frame may be based on current load information.
5. The Master Operator Network Manager sends a Network Slice Preparation Request to the PCRF. Preferably Rx interface is used, e.g. a DIAMETER AAR, the DIAMETER session setup is not detailed in this invention. The Network Slice Preparation Request contains a service description and the affected UEs and a time interval.
6. The PCRF creates a rule according to the Network Slice Preparation Request. The rule is activated during the time interval and is applied for the affected UEs at service request time. It is beneficial if later in the Attach procedure, all UEs that belong to this specific slice are assigned to the same PCRF/PGW. If not done in step 4 by the MONM, the PCRF may create a slice identifier. Based on the slice identifier the PCRF may create a slice rule, or, may create a rule per UE for all UEs belonging to the slice.

If not done in step 4, the PCRF may update the AAA with the list of UEs belonging to the specific slice and the AAA creates a binding with the slice identifier. The MME is part of the slice and the dedicated MME identifier is included in the binding information. The selection of the MME for the time frame may be based on current load information.
7. The PCRF sends a network slice configuration request to the Packet Data Network Gateway PDN-GW or PGW for the affected UEs or simply for a slice using the slice identifier. The PGW may send a network slice configuration request to the Serving GW, SGW, for the affected UEs or the slice identifier and the SGW may send it to the Mobility Management Entity, MME. MME, SGW, PGW apply the rule during the time interval of the slice. The configuration request may be sent via GTP protocol. There is no bearer context since no UE is attached to the network, so the MME, SGW and PGW need to store the rule for the affected UEs until the valid time interval is expired. The MME may be able to signal the Enb (Evolved Node B), e.g. in S1AP Initial request answer, to configure a network slice also for the radio interface. The UEs must have an internal logic to know when to attach to the network. The MME is beneficially the same for all UEs belonging to the same slice and is already allocated in the step 4 or 6, i.e. the MME is able to know which UEs belong to which slice and the UEs have to be redirected to the same MME at time of attach. The MME may retrieve the binding of UEs to network slice from the AAA, this information may be pushed to the selected MME whenever a slice is configured and a binding is created in the AAA. If a UE attaches to a MME then the MME may query the AAA to retrieve the slice identifier and the MME identifier for potential redirection of the attach request.

8. The affected UEs attach to the network.

In another embodiment the MME(s) or the MME pool serving the UEs part of the Network Slicing Request in step 3 can be informed by the MONM after step 5 in order to reserve a certain capacity for handling upcoming service requests. A use case might by a bulk handling of smart meter devices, if the MMEs do have a reserved capacity for the certain time, it needs not to back-off other subscribers in case a massive amount of smart meters send the service request in a very short time. Yet in another embodiment the ANDSF can be notified regarding the network slice policy and the affected UEs, in order to be able to push policies towards particular UEs on-demand. This process can be performed instead and/or in addition to the steps 4-6 in FIG. 4.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a listing of abbreviations used herein:
3GPP 3rd Generation Partnership Project
AAA Authentication, Authorization, and Accounting
ANDSF Access Network Discovery and Selection Function
APIs Application Protocol Interfaces
eNB Evolved Node B
FFT Fast Fourier Transform
GSMA Groupe Speciale Mobile Association
GWCN Gateway Core Network
HSS Home Subscription Subsystem
IFFT Inverse Fast Fourier Transform
MME Mobility Management Entity
MNO Mobile Network Operators
MOCN Multi-Operator Core Network
MONM Master Operator Network Manager
MVNO Mobile Virtual Network Operators
OMA Open Mobile Alliance
OTT Over-The-Top
PCRF Policy and Changing Rules Function
QoS Quality of Service
PGW Packet Data Network Gateway
SECF Service Explore Capability Function
SGW Serving Gateway
SLA Service Level Agreement
UE User Equipment

The invention claimed is:

1. A method for operating a wireless network comprising a management entity for managing the use of network resources, the method comprising, by the management entity:
    performing a network traffic forecast for a time period, the network traffic forecast estimating expected traffic demands with a predefined or tunable confidence degree, wherein the predefined or tunable confidence degree defines a range of predicted future traffic volumes across the time period, wherein the range of predicted future traffic volumes comprises a first predicted future traffic volume associated with an upper limit of the range defined by the predefined or tunable confidence degree and a second predicted future traffic volume associated with a lower limit defined by the predefined or tunable confidence degree;
    dividing forecasted available network resources into one or more classes of traffic corresponding to different service qualities within the classes of traffic using the predefined or tunable confidence degree and the range of predicted future traffic volumes; and
    defining and allocating at least one network resource slice of at least one of the one or more classes of traffic to operators and/or third parties for the time period based on a service level agreement (SLA) of incoming service requests, wherein dividing the forecasted available network resources into the one or more classes of traffic comprises:
        determining a first subset of the forecasted available network resources associated with a first class of traffic that are beyond the first predicted future traffic volume, and
        wherein the first subset of forecasted available network resources are guaranteed resources that address guaranteed traffic needs.

2. The method according to claim 1, further comprising the management entity performing an admission control.

3. The method according to claim 1, wherein the network traffic forecast extracts regular patterns from an aggregated traffic signal or separates forecasting for guaranteed traffic and best-effort traffic.

4. The method according to claim 1, wherein the network traffic forecast is updated at predefined time or observation periods.

5. The method according to claim 1, wherein the classes of traffic or the at least one network resource slice are based on the guaranteed resources, elastic resources, or best-effort resources.

6. The method according to claim 5, wherein the elastic resources or the best-effort resources are provided as a single resource pool or as a number of predefined slices complying with one or more predefined characteristics.

7. The method according to claim 1, wherein the remaining resources, of the forecasted available network resources, are used for providing at least one of the one or more classes of traffic or the at least one network resource slice based on elastic resources or best-effort resources.

8. The method according to claim 1, wherein slices of the at least one network resource slice based on elastic resources or best-effort resources are allocated based on minimizing a utility function which relates the resources by introducing a proportional weight based on request performance parameters or service requirement or characteristic, such that available resources defined for each performance parameter or service requirement or characteristic are minimized.

9. The method according to claim 1, wherein a predefined policy is associated to a slice of the at least one network resource slice.

10. The method according to claim 1, the method further comprising:
translating, by the management entity, a network slice request in a service description and selecting one or more corresponding policy and changing rules function (PCRF), the selection of the PCRF being based on the network slice associated with a user equipment (UE), and/or
creating, by the management entity, a slice identifier out of a set of predefined slice identifiers that corresponds to a specific network slice request parameter for quality of service (QoS) and is configured in a special purpose register (SPR) for use by the PCRF, and/or
sending, by the PCRF, a network slice configuration request to the Packet Data Network Gateway for affected UEs or for a slice using the slice identifier.

11. The method according to claim 1, wherein a slice is restricted in time, is applied to a single User Equipment (UE) or to a group of UEs, or varies in terms of quality of service (QoS) characteristics.

12. The method according to claim 1, wherein the defining and allocating operation is based on a starting time, a mobility profile of a user or UE and/or a duration of a service request.

13. The method according to claim 1, wherein dividing the forecasted available network resources into the one or more classes of traffic further comprises:
determining a second subset of the forecasted available network resources associated with one or more second classes of traffic that are between the first predicted future traffic volume and the second predicted future traffic volume and/or intersect with the first predicted future traffic volume.

14. The method according to claim 13, wherein the second subset of the forecasted available network resources are elastic resources or best-effort resources that are used for best-effort services or delay tolerant services.

15. The method according to claim 1, wherein the range of predicted future traffic volumes are based on previous traffic demands, and wherein the first predicted future traffic volume and the second predicted future traffic volume indicate capacity measurements spanning across the time period.

16. A wireless network comprising a management entity configured to manage the use of network resources, wherein the management entity is configured to:
perform a network traffic forecast for a time period, the network traffic forecast estimating expected traffic demands with a predefined or tunable confidence degree, wherein the predefined or tunable confidence degree defines a range of predicted future traffic volumes across the time period, wherein the range of predicted future traffic volumes comprises a first predicted future traffic volume associated with an upper limit of the range defined by the predefined or tunable confidence degree and a second predicted future traffic volume associated with a lower limit defined by the predefined or tunable confidence degree;
divide forecasted available network resources into one or more classes of traffic corresponding to different service qualities within the classes of traffic using the predefined or tunable confidence degree and the range of predicted future traffic volumes; and
define and allocate at least one network resource slice of at least one of the one or more classes of traffic to operators and/or third parties for the time period based on an SLA of incoming service requests, wherein the management entity is configured to divide the forecasted available network resources into the one or more classes of traffic based on:
determining a first subset of the forecasted available network resources associated with a first class of traffic that are beyond the first predicted future traffic volume, and
wherein the first subset of forecasted available network resources are guaranteed resources that address guaranteed traffic needs.

17. A management entity for managing the use of network resources within a wireless network, wherein the management entity is configured to:
perform a network traffic forecast for a time period, the network traffic forecast estimating expected traffic demands with a predefined or tunable confidence degree, wherein the predefined or tunable confidence degree defines a range of predicted future traffic volumes across the time period, wherein the range of predicted future traffic volumes comprises a first predicted future traffic volume associated with an upper limit of the range defined by the predefined or tunable confidence degree and a second predicted future traffic volume associated with a lower limit defined by the predefined or tunable confidence degree;
divide forecasted available network resources into one or more classes of traffic corresponding to different service quality within the classes using the predefined or tunable confidence degree and the range of predicted future traffic volumes; and
define and allocate at least one network resource slice of at least one of the one or more classes of traffic to operators and/or third parties for the time period based on an SLA of incoming service requests, wherein the management entity is configured to divide the forecasted available network resources into the one or more classes of traffic based on:
  determining a first subset of the forecasted available network resources associated with a first class of traffic that are beyond the first predicted future traffic volume, and
wherein the first subset of forecasted available network resources are guaranteed resources that address guaranteed traffic needs.

* * * * *